United States Patent [19]

Elings et al.

[11] Patent Number: 5,874,734
[45] Date of Patent: Feb. 23, 1999

[54] ATOMIC FORCE MICROSCOPE FOR MEASURING PROPERTIES OF DIELECTRIC AND INSULATING LAYERS

[76] Inventors: Virgil B. Elings, 4664 Via Clarice; Dennis M. Adderton, 4493 Vieja Dr., both of Santa Barbara, Calif. 93110; Dror Sarid, 4149 E. 6th St., Tucson, Ariz. 85711

[21] Appl. No.: 777,655

[22] Filed: Dec. 31, 1996

[51] Int. Cl.[6] .................................................. H01J 37/28
[52] U.S. Cl. .......................................... 250/306; 250/307
[58] Field of Search ..................................... 250/306, 307

[56] References Cited

U.S. PATENT DOCUMENTS

| Re. 34,331 | 8/1993 | Elings et al. | 250/306 |
|---|---|---|---|
| 4,871,938 | 10/1989 | Elings et al. | 310/328 |
| 4,889,988 | 12/1989 | Elings et al. | 250/306 |
| 4,954,704 | 9/1990 | Elings et al. | 250/307 |
| 4,999,494 | 3/1991 | Elings | 250/306 |
| 5,025,658 | 6/1991 | Elings et al. | 73/105 |
| 5,047,649 | 9/1991 | Hodgson et al. | 250/307 |
| 5,051,646 | 9/1991 | Elings et al. | 310/317 |
| 5,066,858 | 11/1991 | Elings et al. | 250/307 |
| 5,077,473 | 12/1991 | Elings et al. | 250/306 |
| 5,081,390 | 1/1992 | Elings | 310/328 |
| 5,103,095 | 4/1992 | Elings et al. | 250/306 |
| 5,144,128 | 9/1992 | Hasegawa et al. | 250/307 |
| 5,163,328 | 11/1992 | Holland et al. | 73/717 |
| 5,189,906 | 3/1993 | Elings et al. | 73/105 |
| 5,198,715 | 3/1993 | Elings et al. | 310/328 |
| 5,204,531 | 4/1993 | Elings et al. | 250/306 |
| 5,224,376 | 7/1993 | Elings et al. | 73/105 |
| 5,229,606 | 7/1993 | Elings et al. | 250/306 |
| 5,237,859 | 8/1993 | Elings et al. | 73/105 |
| 5,253,516 | 10/1993 | Elings et al. | 73/105 |
| 5,266,801 | 11/1993 | Elings et al. | 250/306 |
| 5,306,919 | 4/1994 | Elings et al. | 250/442.11 |
| 5,308,974 | 5/1994 | Elings et al. | 250/234 |
| 5,329,808 | 7/1994 | Elings et al. | 73/105 |
| 5,400,647 | 3/1995 | Elings | 73/105 |
| 5,412,980 | 5/1995 | Elings et al. | 250/306 |
| 5,415,027 | 5/1995 | Elings et al. | 73/105 |
| 5,418,363 | 5/1995 | Elings et al. | 250/306 |
| 5,463,897 | 11/1995 | Prater et al. | 73/105 |
| 5,519,212 | 5/1996 | Elings et al. | 250/234 |
| 5,553,487 | 9/1996 | Elings | 73/105 |
| 5,557,156 | 9/1996 | Elings | 310/316 |
| 5,560,244 | 10/1996 | Prater et al. | 73/105 |

OTHER PUBLICATIONS

"Scanning Capacitance Microscopy for Carrier Profiling in in Semiconductors"; Digital Instruments article by Andrew N. Erickson, published by Digital Instruments, Inc. (Jul. 1996).

"High resolution Fowler–Norheim field emission maps of thin silicon oxide layers", by Ruskell et al., published in Appl. Phys. Lett. 68 (1), 1 Jan. 1996, pp. 93–95.

*Primary Examiner*—Jack I. Berman
*Attorney, Agent, or Firm*—Patrick F. Bright

[57] ABSTRACT

An atomic force microscope that has an electrically-conductive probe and tip includes a feedback control circuit for generating a substantially constant, desired Fowler-Nordheim current between the probe tip and the surface of an electrically-conductive sample having a thin dielectric or insulating film thereon. The feedback circuit maintains the desired Fowler-Nordheim current flow between the probe tip and the sample by adjusting the bias voltage applied to the probe tip, and by tracking and using the changes in the applied bias voltage to provide a measure of the thickness, electrical conductivity or other electrical property of the film.

33 Claims, 3 Drawing Sheets

ATOMIC FORCE MICROSCOPE FOR MEASURING PROPERTIES OF DIELECTRIC AND INSULATING LAYERS

The present invention is directed to atomic force microscopes (AFMs) that can measure the thickness, and other properties, of thin dielectric or insulating films. In these AFMs, a feedback control system controls a bias voltage to maintain an essentially constant Fowler-Nordheim (FN) emission current between a conductive AFM probe and a sample having a thin dielectric or insulating coating, e.g. an oxide coating, to provide a measure of the film thickness, conductivity or other electrical property, as the probe is scanned over the surface of such a sample, or vice-versa, with good lateral resolution.

AFMs are described in U.S. Reissue Pat. No. 34,489, and U.S. Pat. Nos. 5,226,801; 5,415,027; 5,412,980; 5,519,212; 5,463,897; and 5,418,363. The texts of these patents are incorporated herein by reference. AFMs have a probe, i.e. a sharp tip on a lever arm. The tip is brought into near-contact, or contact, with the surface of a sample to be scanned. The force of contact is measured by the deflection of the lever arm, with the feedback system moving the tip, or alternatively, the sample, up and down, to maintain a constant force as the tip is scanned across the sample, or the sample across the tip.

AFMs have been used to analyze thin dielectric or insulating films which are used for insulating layers in ultra-large scale integration technology (ULSI). A key issue of ULSI is the quality and reliability of such films on such devices. Gate lengths of less than 180 nm, and film thicknesses of less than 5 nm, will be required as the semiconductor industry seeks higher storage levels in memory chips with thinner and thinner films. As gate dimensions decrease, small defects in the film can have dramatic effects. High lateral resolution of local electrical properties of such films will be increasingly required.

Currently, there is no good method for analyzing such films for local thinning. Existing processes suffer from such disadvantages as low sampling speed, destructive breakdown of films, and poor lateral resolution. Any such analysis involves measurement of lateral resolution on a tens-of-nanometers scale.

Some methods use FN field emission current that is induced by an electric field to measure thin film thickness. An FN field emission current is the measure of the density of electrons extracted from cold conductors or semiconductors by application of a strong electric field, and such measure is extremely sensitive to the electrical field.

Prior use of AFMs with conductive tips required a long sampling time at each data point. To measure thin film thickness at a particular data point without catastrophically breaking down the film, AFMs to date have placed the AFM tip on the film and applied a bias voltage. The bias voltage was increased, typically as a ramp in time, to generate an IV (current-to-voltage) curve for each data point, or a representative group of points, to ascertain the characteristic shape of the IV curve, and the maximum voltage required for the maximum pre-breakdown current. To generate an image of the local dielectric properties of an area of a film-coated sample, this time-consuming procedure was repeated at each data point. To avoid damage to the sample, the voltage ramp needed to be somewhat slow so that a large breakdown current did not occur.

Increased sampling time often impaired accuracy because of film modification and instrument drift. The application of a bias voltage can modify a thin film at the point between the scanning tip and the sample, and can potentially contribute to formation of oxides between the tip and the film during measurement. Thermal or mechanical instrument drift in the relative motion of tip and sample increase with time.

SUMMARY OF THE INVENTION

This invention comprises new AFMs and new methods of operating such AFMs wherein an FN current passing between the AFM's conductive probe tip and a sample having a thin dielectric or insulating film thereon is held at a substantially constant, desired value by a feedback loop that varies the voltage applied between the tip and sample, and that removes or otherwise negates any parasitic current that may be present. Variations in voltage are recorded and processed, or otherwise used, to provide information about the electrical and physical properties of the film and the sample. Preferably, the force between the tip and the film on the sample is kept constant with another feedback loop in which a sensor detects the bending of the AFM cantilever due to the force of the tip on the surface, and controls this bending to be essentially constant.

Preferably, these new AFMs detect and correct for the effects of parasitic capacitance on the tip-sample current. Parasitic capacitance draws additional current in direct proportion to an increase in the rate of change of the bias voltage. These AFMs measure this parasitic capacitance, and adjust feedback to control the FN current which is the difference between the total measured current and the parasitic current. For example, the parasitic capacitance may be measured by reducing the FN current so that only the parasitic current remains, or by changing the bias voltage sufficiently to determine the current resulting from parasitic capacitance.

Reduction of the FN current so that the parasitic current is all that is flowing may be accomplished in many ways. Some examples are lifting the AFM tip off the sample, moving the AFM tip over a thick film area on the sample, or modulating the bias voltage at a value below that necessary for breakdown.

Change of bias voltage to measure parasitic capacitance may also be accomplished in a variety of ways. Some examples include ramping the voltage and modulating the voltage. Either of these may be done at a voltage below that required for breakdown. This allows observation of the effect of the parasitic capacitance alone, without any current flowing from tip to film.

Alternatively, the FN current can be separated from the parasitic current by oscillating the probe over the surface of the sample. The FN current is so sensitive to the dielectric gap, including the air gap, that the measured current will vary from FN current plus parasitic current, when the tip is on the surface, to parasitic current only when the tip is off the surface. The difference is the FN current which may then be used in the feedback circuit. This difference will occur at oscillation frequency. As an example, this method could include vertical oscillation of the tip, such as tapping, as described in U.S. Pat. No. 5,412,980.

The feedback loop of the new AFMs controls the tip-sample current. If the current becomes too great, the film on the sample may break down and become immeasurable. To keep the current constant, the feedback loop varies the voltage during scanning, and tracks and uses these voltages as a measure of film thickness, conductivity, or other electrical properties.

These new AFMs reduce the time spent at each data point on a film, and therefore reduce the total time required to scan an entire film coating. This increased speed also increases the accuracy of measurement by reducing instrument drift and by minimizing potential changes to the film during scanning. The increased speed should also assist manufacturing applications for in-line production testing.

LIST OF REFERENCE NUMERALS

1. Conductive tip
2. Current to voltage amplifier
3. Analog to digital converter
4. Digital bias control
5. Digital to analog converter
6. Processor/computer
7. Voltage image
8. Dielectric or insulating film
9. Substrate/sample
10. XYZ translator
11. Cantilever
12. AFM feedback processor and control
113. Analog bias control
14. Topography image
15. Processor
16. XY scan control
17. Deflection detector
18. Z translation control
19. Bias voltage supply
20. Difference amplifier
21. Differentiator
22. Feedback processor
23. Stray capacitance
24. Fowler-Nordheim (FN) field emission current
25. Parasitic current ($I_p$)
26. Total current ($I_{tot}$)

BRIEF DESCRIPTION OF THE DRAWINGS

The invention can be better understood by reference to the following detailed description and the accompanying drawings, wherein.

DETAILED DESCRIPTION OF THE PREFERRED EMBODIMENTS

In these new AFMs, a feedback loop servos a bias voltage that is applied between the AFM probe tip and sample with a dielectric or insulating film to maintain a substantially constant current across the tip and film. As a result, the time and calculations required to detect and map the electrical properties of the film are small. One embodiment of this invention utilizes a feedback loop to maintain the FN current flowing through the tip and film at a desired value, and records the changes in voltage to provide a map of film thickness or electrical properties such as conductivity.

Figure 1:
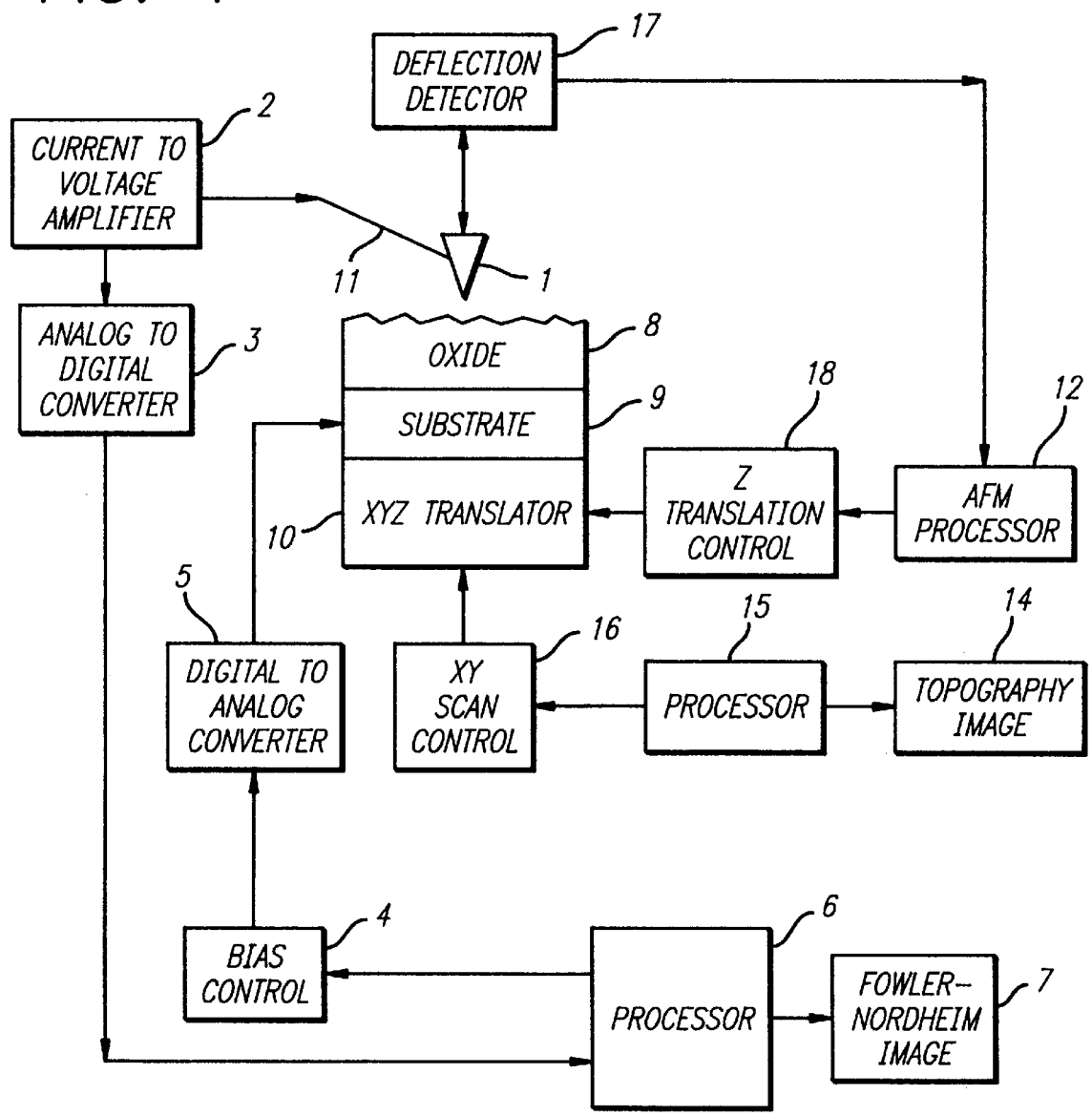
FIG. 1 is a functional block diagram of feedback, probe positioning and imaging apparatus of an atomic force microscope of this invention using digital bias voltage control.

FIG. 1 shows the application of a bias voltage between conducting scanning tip 1 of an AFM and conductive substrate 9 of a sample. Tip 1 is brought into contact with thin dielectric film 8. A sufficiently high bias voltage is applied to cause a small breakdown current (FN current) of a desired amount to flow through thin dielectric film 8 on the surface of substrate 9. The value of the current is compared to a user-defined setpoint current value, and the bias voltage is servoed to maintain the current at a substantially constant, desired value which is low enough to prevent catastrophic breakdown. This AFM uses analog-to-digital converter 3 between current-to-voltage amplifier 2 and processor 6 as well as digital-to-analog converter 5 between bias controller 4 and substrate 9. Bias controller 4 can be a programmable digital processor.

FIG. 1 also shows the formation of Fowler-Nordheim image 7 based on signals from processor 6. Processor 6 receives signals from analog-to-digital converter 3 and processor 15. Processor 6 also delivers bias signals to bias control 4. From bias control 4, these signals pass through digital-to-analog converter 5, and are applied to substrate 9.

FIG. 1 also shows a feedback loop that includes XYZ translator 10, Z translation control 18, AFM processor 12, deflection detector 17 and cantilever 11. Control 18 delivers signals to translator 10 based on signals from processor 12. Processor 12 receives signals from detector 17, which senses the deflection of probe 11.

XY scan control 16 also delivers signals to XYZ translator 10. XY scan control 16 receives signals from processor 15 which uses those signals, and the signal from control 18, to generate a topographical image of the sample surface at display 14.

Figure 2:
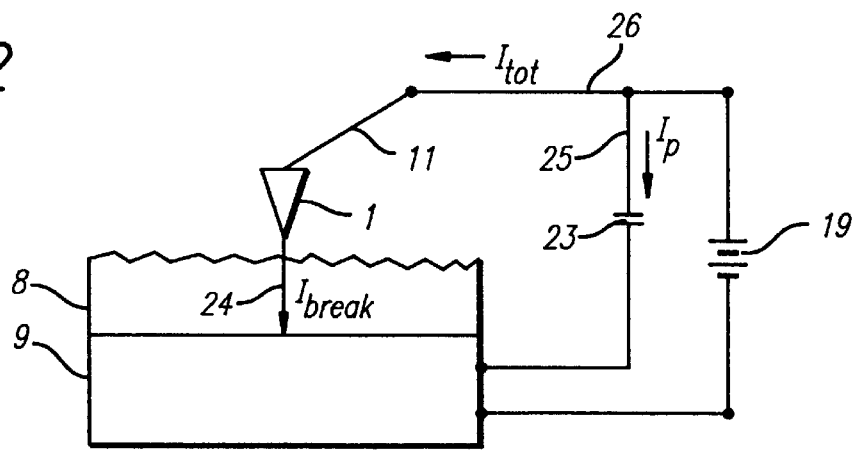
FIG. 2 is a functional block diagram of the FN field emission current.

FIG. 2 shows in schematic form the elements of the electrical circuit to cause an FN field emission current to flow through thin dielectric film 8 on top of substrate/sample 9. The total current flowing in the circuit is the sum of the FN current 24, or $I_{FN}$, and parasitic current 25, or $I_p$. Bias voltage supply 19 supplies the current and is controlled to keep either the total current essentially constant or the FN current constant, depending on the embodiment.

Figure 3:
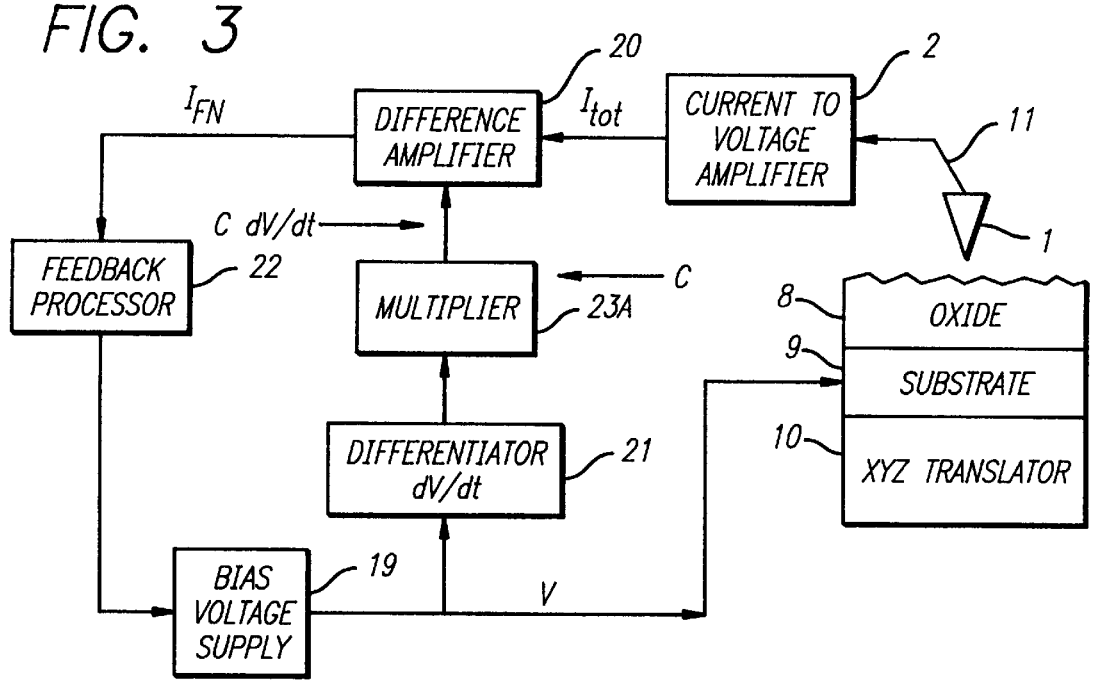
FIG. 3 is a diagram of feedback as measured by the difference between the current at the amplifier and the current drawn by the parasitic capacitance in the AFM of FIG. 1.

FIG. 3 shows a block diagram of an analog embodiment where the difference between the total current and a value for the parasitic current, $$C \frac{dV}{dt},$$

is used in the feedback to control the bias voltage supply to keep this difference constant.

$$C \frac{dV}{dt}$$

is made by differentiator 21 and then multiplied by a value C for the parasitic capacitance determined by the user. This value could be determined simply by raising tip 1 off the surface of oxide 8, modulating the bias voltage and adjusting C until the output of the difference amp is zero. This would mean that the parasitic capacitance has been accounted for by the circuit.

FIG. 3 also shows multiplier 23A. Multiplier 23A multiplies the value C for the parasitic capacitance times dV/dt, and delivers the product C(dV/dt) to difference amplifier 20. The signal from amplifier 20, called $I_{FN}$, (Fowler-Nordheim current), passes through feedback processor 22 to bias voltage supply 19. Supply 19 delivers bias voltage signals to substrate 9 to keep the Fowler-Nordheim current substantially constant between substrate 9 and sensing tip 1 through thin insulating layer 8. Supply 19 also delivers bias voltage signals to differentiator 21.

Figure 4:
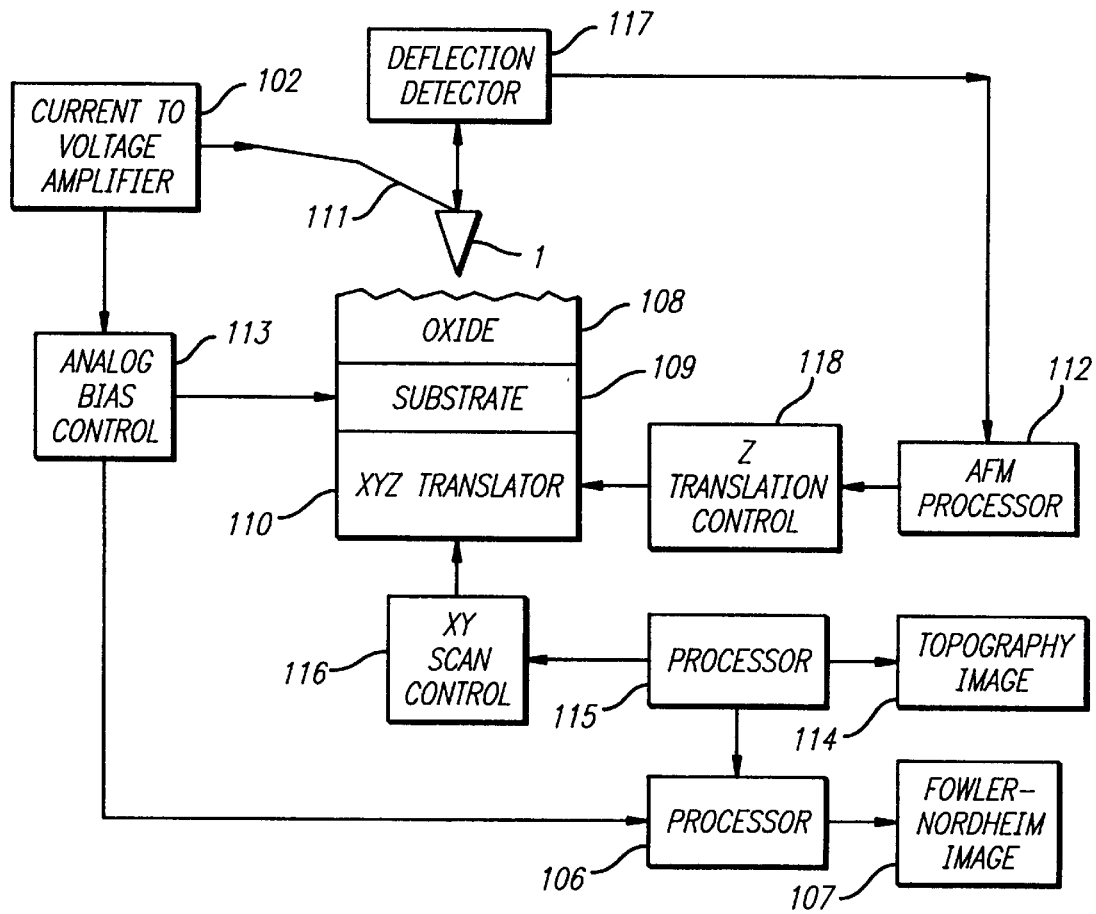
FIG. 4 is a functional block diagram of the feedback, probe positioning and imaging apparatus of an atomic force microscope of this invention using analog bias control.

FIG. 4 shows using analog bias controller 113 instead of digital bias controller 4. Controller 113 obviates the need for analog-to-digital converter 3 and digital-to-analog converter 5.

In addition to tracking and recording voltage changes, the AFM can also measure, simultaneously or otherwise, the sample's topography or other characteristics. The AFM causes tip 1 to track the sample surface while the FN current is measured.

This AFM uses a feedback loop (FIG. 1) to maintain the current at a user-defined level by adjusting the voltage. The current due to the parasitic capacitance of the electronics is reduced in this embodiment by scanning slowly to keep the rate of change of this bias voltage low. It is this rate of change of bias voltage which causes the parasitic current.

Figure 5:
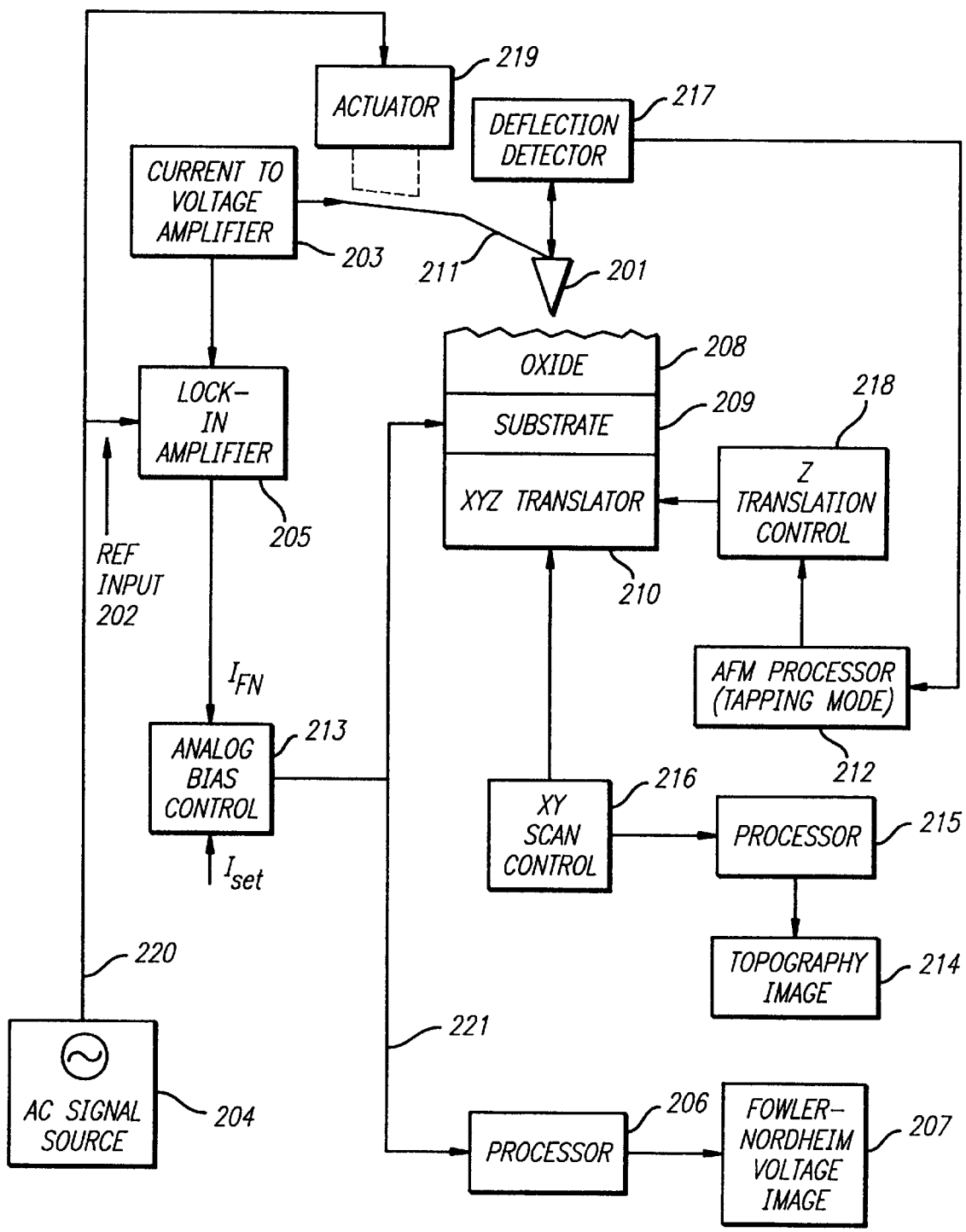
FIG. 5 is a functional block diagram of an embodiment in which the AFM probe height is modulated in order to modulate the FN current.

FIG. 5 shows an embodiment where tip 201 is modulated up and down on the surface of oxide 208 by actuator 219 in order to modulate the FN current through the oxide. This modulation is filtered out by the lock in amplifier 205 to give a signal proportional to the FN current. Analog bias control 213 then controls bias voltage 221 to keep $I_{FN}$ essentially equal to $I_{SET}$, the setpoint current. The tip height modulation is done by AC signal source 204. Instead of the lock-in amplifier, one could use a filter to obtain a signal proportional to $I_{FN}$. During scanning, in which either the probe or the sample is scanned laterally. The probe motion is detected by deflection detector 217 and used, through AFM processor 212 and the Z-translation control to keep the modulation motion of the tip constant (see a Tapping Atomic Force Microscope). During scanning, topography map 214 of Z versus X and Y is made and simultaneously an FN voltage versus X and Y map is also made.

The preferred AFM embodiment operates in the contact mode. Other modes of operation, such as tapping or intermittent contact as described in U.S. Pat. No. 5,412,980, may also yield usable data. The preferred AFM embodiment uses tip-sample current as the signal to control bias voltage feedback as opposed to adjusting the probe height.

When adjusting the voltage to keep the breakdown FN current constant, the current consists of: (1) the FN current, and (2) the current due to the parasitic capacitance and the rate of change of the bias voltage, i.e., $$I_{tot} + I_{FN} + C\frac{dV}{dt}$$

Preferably, $I_{FN}$ is maintained at a constant value, as, for example, by scanning slowly so that the rate of change of the bias voltage $$\frac{dV}{dt}$$

is small, and the term $$C\frac{dV}{dt}$$

is much smaller than $I_{FN}$.

A method of error correction to scan rapidly and keep $I_{FN}$ constant is to calculate and subtract $$C\frac{dV}{dt}$$

from $I_{tot}$ during feedback. A feedback controller is preferably digital, determines $$C\frac{dV}{dt},$$

and then controls the bias voltage to keep $$I_{FN} = I_{tot} - C\frac{dV}{dt}$$

constant to insure low FN currents, even at high scan speeds.

In FIG. 3, the actual FN current is calculated by finding the difference between the total current and the current drawn by the parasitic capacitance. Parasitic capacitance may be measured by breaking the electrical connection between the tip and sample and modulating the bias voltage. Breaking this connection may be accomplished by separating the tip from the sample or by placing the tip onto a thick film on the sample surface.

The parasitic capacitance, C, may also be measured by modulation of the bias voltage at a low value such that the FN current is negligible. Such voltage modulation would yield changes in current only from parasitic capacitance of $$C\frac{dV}{dt},$$

knowing $$\frac{dV}{dt}$$

and the resulting current provides a measure of parasitic capacitance.

Preferred embodiments use a conductive tip of silicon coated with cobalt chrome, diamond-like carbon or gold. Another tip that could be used is a conductive diamond mounted on a lever or a diamond tip with a conductive metallic coating.

FIG. 4 shows another embodiment of the AFM of this invention. Here, analog bias controller 113 changes the bias voltage to sample 109 to maintain a desired, selected FN current at a substantially constant value. Current to voltage amplifier 102 receives signals representative of current from probe 111 and delivers signals to control 113 which controls the voltage on substrate 109 to keep the current between probe 111 and substrate 109 substantially constant.

As FIG. 4 shows, the AFM of this invention also includes XYZ translator 110 in a feedback loop that includes deflection detector 117, AFM processor 112, and Z translation control 118. XYZ translator 110 is, in part, under the control of XY scan control 116 and its associated processor 115. Processor 115 outputs signals which provide topographical images at 114. The changes in voltage that maintain the FN current at the user-selected value appear on path 121 to processor 106 which delivers signals to FN voltage image device 107.

FIG. 5 shows an AFM that uses oscillating probe 211 to monitor the FN current. This AFM increases the speed of the measurement by monitoring only the FN current and ignoring the displacement current that results from the probe-sample parasitic capacitance. Excitation piezo 219 delivers an oscillation force to probe 211, resulting in oscillation of probe tip 201 toward and away from thin dielectric oxide film 208 on substrate 209. Current-to-voltage amplifier 203 detects the resulting modulation in the FN current. As tip 211 is lifted from the surface of oxide film 208, and then returned to the surface, the FN current turns on and off with the same periodicity as determined by AC signal source 204, which delivers the desired AC signal on path 220 to excitation piezo 219. The detected FN current is then fed to lock-in amplifier 205 or to a filter which produces a voltage signal corresponding to the amplitude of the modulated FN current signal with the aforementioned periodicity. As FIG. 5 shows, reference input 202 is also fed to lock-in amplifier 205. The lock-in amplifier output does not contain the displacement current because that current is not modulated by the lifting of tip 201 toward and away from the surface of thin dielectric film 208.

As with the AFM of FIG. 4, this AFM also includes XYZ translator 210 with Z translation controller 218 in a feedback loop with AFM processor 212 and deflection detector 217 linked to probe arm 211. XY scan controls 216, under the control of processor 215, yields signals providing a topographical image of the sample surface at 214. Voltage signals on path 221 pass to processor 206 and then to FN voltage image display 207.

What is claimed is:

1. A method of measuring the properties of a thin dielectric or insulating film on an electrically-conductive sample comprising the steps of:
   (a) providing an atomic force microscope, or AFM, with a conducting probe tip mounted on end of a lever arm;
   (b) providing an electrically-conductive sample having said thin dielectric or insulating film on its surface;
   (c) providing a bias voltage between said sample and said probe;
   (d) measuring the current flowing between the tip of the probe and the sample;
   (e) providing relative motion between the tip of the probe and the sample whereby said tip scans at least a portion of said thin dielectric or insulating film;
   (f) using the current flowing between said probe tip and said sample to control said bias voltage during said scanning; and
   (g) using said controlled bias voltage as a measure of at least one property of said thin dielectric or insulating film.

2. The method of claim 1 wherein said AFM probe is a probe mounted on a flexible lever.

3. The method of claim 2 wherein the force of said probe tip and said thin dielectric or insulating film are maintained at a substantially constant, predetermined value during said scanning.

4. An atomic force microscope that includes:
   a probe having a probe tip mounted on one end of a lever arm, said probe tip being electrically-conductive;
   an electrical connector for connecting an electrically-conductive sample having a thin dielectric or insulating coating thereon to an electrical circuit that includes said electrically-conductive probe tip, and, between said electrically-conductive probe tip and said electrical connector, a feedback control circuit that maintains a substantially constant, desired Fowler-Nordheim (FN) current value between said probe tip and said sample and provides a bias voltage between said probe tip and said sample and adjusts said bias voltage to maintain said FN current at said substantially constant, desired value.

5. A method of operating an atomic force microscope that includes a probe comprising an electrically-conductive probe tip mounted on one end of a lever arm comprising:
   translating said probe tip with respect to the surface of an electrically-conductive sample that has a thin dielectric or insulating film thereon;
   gathering data representative of the surface of said sample during said translating;
   maintaining the force between said probe tip and the surface of said sample substantially constant;
   maintaining a substantially constant Fowler-Nordheim (FN) electrical current between said probe tip and the surface of said sample by varying the bias voltage between said probe tip and the surface of said sample; and
   using the bias voltage variations to determine the thickness or an electrical property of the film.

6. The method of claim 5 wherein said FN current is maintained at a substantially constant value below the value at which destructive breakdown of said film occurs.

7. An atomic force microscope comprising a probe having:
   an electrically-conductive probe tip mounted on one end of a lever arm; and
   a feedback control circuit that includes said electrically-conductive probe tip and adjustable bias voltage control, said control being adjustable to maintain a desired current between said probe tip and a sample that is electrically-conductive or electrically-semiconductive.

8. The atomic force microscope of claim 7 further comprising circuitry to make an image of a representation of the bias voltage.

9. The atomic force microscope of claim 7 or claim 8 wherein said probe is bendable, and further comprising a second feedback control circuit that includes said probe, a sensor to detect the bending of said probe, and controls that maintain the force imposed on said sample by said probe tip at a desired value.

10. The atomic force microscope of claim 9 further comprising circuitry connected to said second feedback loop to produce signals representing a topographical image of the surface of the sample.

11. The atomic force microscope of claim 10 further comprising circuitry to eliminate, in said bias voltage feedback control circuit, the effect of electrical current from parasitic capacitance.

12. The atomic force microscope of claim 8 further comprising circuitry to eliminate, in said bias voltage feedback control circuit, the effect of electrical current from parasitic capacitance.

13. The atomic force microscope of claim 7 further comprising circuitry to eliminate, in said bias voltage feedback control circuit, the effect of electrical current from parasitic capacitance.

14. The atomic force microscope of claim 13 wherein said circuitry subtracts a multiple of the rate of change of the bias voltage (dV/dt) from the tip current to eliminate the effect of current from parasitic capacitance.

15. The method of claim 7 further comprising subtracting parasitic capacitance current arising from parasitic capacitance in the feedback control circuit.

16. A method of operating an atomic force microscope that includes a probe having an electrically-conductive probe tip mounted on one end of a cantilever arm comprising:

translating said probe tip with respect to the surface of an electrically-conductive or electrically-semiconductive sample;

applying a bias voltage between said probe tip and said surface of said sample; and maintaining a desired electrical current between said probe tip and said surface of said sample by varying said bias voltage.

17. The method of claim 16 further comprising maintaining said desired electrical current at a desired, substantially constant value.

18. The method of claim 16 or claim 17 wherein said sample has a thin dielectric or thin insulating film on a surface of said sample.

19. The method of claim 18 wherein said current is maintained at a desired, substantially constant value that is below the value at which destructive breakdown of said thin dielectric or said thin insulating film occurs.

20. The method of claim 18 further comprising subtracting parasitic current arising from parasitic capacitance.

21. The method of claim 16 or claim 17 further comprising subtracting parasitic current arising from parasitic capacitance.

22. The method of claim 21, further comprising subtracting, as the parasitic current, a multiple of the rate of change of the bias voltage.

23. The method of claim 22, further comprising modulating the bias voltage below the voltage at which a current flows between said tip and said sample to determine said multiple, and then determining said parasitic capacitance.

24. The method of claim 16 further comprising maintaining the force between said probe tip and said sample at a desired value.

25. A method of scanning a thin dielectric film or a thin insulating film on an electrically-conductive or electrically-semiconductive sample comprising the steps of:

(a) providing an atomic force microscope (AFM) with an electrically-conductive probe tip;

(b) providing an electrically-conductive sample having said thin dielectric film or said thin insulating film on its surface with said probe tip in contact with said film;

(c) providing a bias voltage between said sample and said probe;

(d) providing relative lateral motion between the tip of said probe and said sample whereby said tip scans at least a portion of said thin dielectric film or said thin insulating film; and (e) maintaining the current flowing between said tip of said probe and said sample at a desired value by varying said bias voltage.

26. The method of claim 25 wherein said probe tip is mounted at one end of a lever arm.

27. The method of claim 26 wherein said lever arm is flexible.

28. The method of claim 25 wherein the force between said probe tip and said thin dielectric film or said thin insulating film is maintained at a substantially constant desired value during said scanning.

29. The method of claim 26 wherein the force between said probe tip and said thin dielectric film or said thin insulating film is maintained at a substantially constant desired value during said scanning.

30. A method of operating an atomic force microscope that includes a probe comprising an electrically-conductive probe tip mounted on one end of a lever arm comprising the steps of:

(a) translating said probe tip with respect to the surface of an electrically-conductive or electrically-semiconductive sample;

(b) modulating the distance between the tip of said probe and the surface of said sample during scanning to modulate the current between said probe tip and said sample;

(c) applying a bias voltage between said sample and said probe tip; and (d) maintaining a desired modulation amplitude of electrical current between said probe tip and said surface of said sample by varying said bias voltage.

31. The method of claim 30 further comprising maintaining the modulation distance between said probe tip and said sample at a substantially constant desired value during said scanning.

32. A method of operating an atomic force microscope that includes a probe having an electrically-conductive probe tip mounted on one end of a cantilever arm comprising:

translating said probe tip with respect to the surface of an electrically-conductive or electrically-semiconductive sample;

applying a bias voltage between said probe tip and said surface of said sample;

modulating the vertical position of said probe such that said probe is lifted from, and placed upon, the surface of said sample during said translating whereby the current between said probe tip and said sample is modulated; and maintaining a desired electrical current between said probe tip and said surface of said sample by varying said bias voltage.

33. The method of claim 32 wherein said bias voltage is controlled to maintain the amplitude of said modulated current flowing between said probe tip and said sample at a substantially constant, desired value during said translating.

* * * * *